United States Patent [19]
Bley et al.

[11] 3,877,892
[45] Apr. 15, 1975

[54] SEPARATION OF FLUID SUBSTANCES

[75] Inventors: Peter Bley, Spock; Wolfgang Ehrfeld, Ettlingen; Gerd Eisenbeiss, Karlsruhe, all of Germany

[73] Assignee: Gesellschaft fur Kernforschung m.b.H., Karlsruhe, Germany

[22] Filed: Sept. 6, 1973

[21] Appl. No.: 394,846

[30] Foreign Application Priority Data
Sept. 6, 1972 Germany............................ 2245730

[52] U.S. Cl........................................ 55/17; 55/392
[51] Int. Cl............................................. B01d 59/00
[58] Field of Search................. 55/17, 277, 392–398

[56] References Cited
UNITED STATES PATENTS
3,362,131  1/1968  Becker.................................... 55/17
3,708,964  1/1973  Becker et al.......................... 55/392

Primary Examiner—Charles N. Hart
Attorney, Agent, or Firm—Spencer & Kaye

[57] ABSTRACT

In the separation of a gaseous or vaporous mixture into components having respectively different molecular weights and/or gas kinetic cross sections, where a first separation is achieved by passing the mixture through a first nozzle type opening and around a first skimmer diaphragm, further separations are achieved by deflecting at least one of the partial streams passing the first skimmer and subjecting the deflected partial stream to the action of a second skimmer diaphragm which divides that partial stream into further partial streams.

6 Claims, 2 Drawing Figures

SEPARATION OF FLUID SUBSTANCES

BACKGROUND OF THE INVENTION

The present invention relates to a method and an apparatus for separating gaseous or vaporous substances, particularly isotopes, having different molecular weights and/or different gas kinetic cross sections, in which the substances to be separated flow, possibly mixed with a light additional gas, as an expanded stream through a nozzle-type opening and the stream is separated by means of a skimmer diaphragm.

The principle of this so-called separating nozzle method is disclosed in German Pat. No. 1,052,955. It is also known, as disclosed in German Pat. Nos. 1,096,875 and 1,198,328, that the economy of operation of the process can be improved by use of a light additional gas, possibly in combination with stream deflection.

If the process is used, for example, to separate isotopes, it is necessary, in order to attain a degree of enrichment which is useful in practice, to arrange a plurality of separating nozzles in a row in cascade, the expanded gas being returned to its original nozzle pressure by means of a compressor after passage through each nozzle. It is of great importance, for the economic operation of the process, that the pressure ratio produced by the compressor, i.e., the ratio between compressor inlet and outlet pressure, be as small as possible for achieving a given separation or that the separation be as great as possible for a given pressure ratio.

To this end, German Pat. No. 2,031,687 describes a method for separating gas mixtures by the separating nozzle method in which the kinetic energy of the gas stream after its separation into two partial streams is utilized to increase the pressure. At least two identical partial streams which come from different separating nozzles are combined into a common stream immediately downstream of the skimmer diaphragms. With this measure it is possible to reduce the operating costs of the process, but an increase in the separating factor, or degree of separation, is not usually noted; the number of separating nozzles which must be connected in series is thus not reduced.

SUMMARY OF THE INVENTION

It is an object of the present invention to reduce the cost of such separation operations.

Another object of the invention is to increase the degree of separation achieved at each stage of apparatus for achieving such separation.

A further object of the invention is to reduce the number of stages required for achieving a desired degree of separation.

The present invention is based on the discovery that the operating costs for an arrangement of separating nozzles can be reduced, with a significant increase in the separating factor, if at least one of the partial streams is used for a further separation while the kinetic energy contained therein is utilized in connection with at least one deflection following directly behind, or downstream of, the skimmer diaphragm, and further skimmer diaphragms produce further partial streams following the deflection. One or a plurality of the subsequent streams can be further accelerated by additional expansion.

When the method of the present invention is utilized in a cascade system, it is advisable to combine those partial streams from the various stages which are directed toward the system outlet and which have substantially the same composition with respect to the substances to be separated. In special cases it may also be advisable, for technical reasons, to combine individual partial streams created in the practice of the method of the present invention and remove them together without this constituting a departure from the basic concept of the present invention.

In apparatus for performing the method according to the present invention, there are provided a nozzle-type opening and a first skimmer diaphragm which form a known nozzle separator device, the surface of at least the first skimmer diaphragm facing the partial stream or streams is used to effect a further separation and is designed as a deflecting wall, and further skimmer diaphragms are disposed at the end of the deflecting wall, or further deflecting walls, in the flow direction of the further partial stream or streams.

DESCRIPTION OF THE PREFERRED EMBODIMENTS

Figure 1:
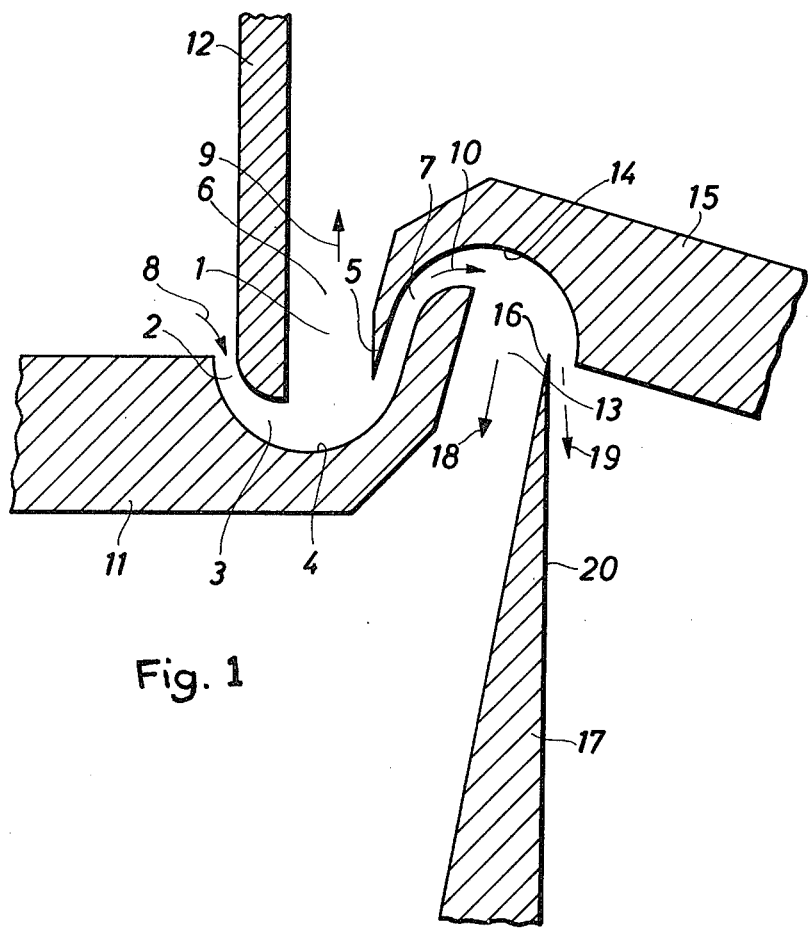
FIG. 1 is a cross-sectional view of a preferred embodiment of a separation system according to the invention.

FIG. 1 illustrates a system in which a first separation takes place in a separating nozzle 1 having an inlet channel 2, an inflow nozzle 3, a deflecting wall 4, and two extraction channels 6 and 7. Deflecting wall 4 is formed to cooperate with a first skimmer diaphragm 5.

The gaseous mixture 8 to be separated is placed under an initial pressure $p_o$ and travels through inlet channel 2 to nozzle 3. There the mixture is deflected by wall 4 and divided by means of skimmer 5 into two first partial streams 9 and 10. The partial stream 9 which is richer in the lighter component of the mixture 8 is removed through channel 6 while at a pressure $p_m$ which is less than $P_o$. The partial stream 10 which is richer in the heavier component of the original mixture flows into channel 7.

The component 11 bearing deflection wall 4 forms the nozzle 3 together with a border wall 12 which is disposed between the gas chamber for supplying the mixture 8 and the partial stream 9. In addition, component 11 forms channel 7 together with skimmer diaphragm 5.

Mixture 8 expands while flowing through nozzle 3. The skimmer diaphragm 5 deflects a portion of the stream 8 through channel 7 as the first partial stream 10 and feeds it into a further separating device 13. Further separating device 13 deflects this first partial stream 10, which expands while leaving channel 7, by means of a further deflecting wall 14. The deflecting wall 14 is part of the surface of skimmer 5 which faces the first partial stream 10, i.e., is a surface of the component 15 defining skimmer 5.

At the end of the further deflecting wall 14, when seen in the direction of flow of the undivided first partial stream 10, there is a further skimmer diaphragm 16 which is formed by a component 17 and which divides the first partial stream 10 into two further partial streams 18 and 19 richer in the lighter and heavier components, respectively, of partial stream 10.

In a special experimental separating test performed with a gas mixture consisting of 10 mol % $UF_6$ and 90 mol % $H_2$ utilizing a separator element having the form illustrated in FIG. 1, the concentration of the uranium isotopes in the three partial streams 9, 18, 19 was determined by mass spectrometry. It was found that the specific quantity of energy, which constitutes a measure for the operating costs for the process, was less by 20% than in an experiment with otherwise the same conditions and utilizing the known nozzle separator arrangement forming the first part of the arrangement of the illustrated embodiment. Additionally, an increase in the separating factor was noted which resulted in a reduction by 30% of the number of separating nozzle stages required in a series-connected cascade.

In the illustrated embodiment the structure and operation of the present invention is shown for a first separating stage operating with curved nozzles. The present invention can also be used for a straight nozzle 3, i.e., a nozzle with linear sides, operating according to the same principle. The light fraction, or both fractions simultaneously, can also be treated according to the concept on which the present invention is based.

With multiple deflection, i.e., multiple fraction extraction, the surface of the further skimmer diaphragms, e.g., surface 20 of component 17, or skimmer 16, facing the separated further partial stream would have to be designed as a deflecting wall. That is, surface 20 would have a form similar to that of wall 14 and would define a generally S-shaped path therewith. The particular mixture to be separated and the desired conditions will determine the precise value of the arc angle enclosed by the respective deflecting walls 4 and 14 and their lengths; the selection of the fraction for the further separation can be made as desired.

For separation of the uranium isotopes, particularly favorable economic results can be obtained by employing the following specific operating conditions to the embodiment illustrated in FIG. 1: The gaseous mixture 8 consisting of 5 mol-% $UF_6$ (uranium hexafluoride) and 95 mole-% $H_2$ (hydrogen) is placed under an initial pressure $P_o = 250$ mm Hg. The partial streams 9, 18 and 19 are removed at a pressure $p_m = 85$ mm Hg. The width of the inlet channel 2 is 0.03 mm, the radius of curvature of the deflecting wall 4 is 0.075 mm, and the arc angle of the wall 4 is about 180°. The radius of curvature of the border wall 12 which forms the inflow nozzle 3 together with the deflecting wall 4 is 0.04 mm and the arc angle of the wall 12 is about 90°. The skimmer diaphragm 5 has a cuneiform shape and the angle between the side walls is about 15°. The width of the channel 7 is 0.013 mm, the radius of curvature of the deflecting wall 14 is 0.05 mm and the arc angle of the wall 14 is about 180°. The angle between the side walls of the cuneiform skimmer 16 is 15°. The total length of the slit-shaped separation system is large compared to the above-said dimensions. Under these operating conditions flow velocities of about 200 to 400 m/s are reached in the separation system and a separation between the uranium isotopes, i.e. between U–235 $F_6$ and U–238 $F_6$, takes place as a result of the strong centrifugal force and the pressure gradients in the curved flow, respectively. As a measure of the separation between two partial streams the separation factor A or the elementary separation effect A–1 is used. The separation factor is defined by the equation $$A = \frac{n_c(1-n_d)}{n_d(1-n_c)}.$$

where $n_c$ is the mole fraction of U–235 $F_6$ in a partial stream enriched in U–235 and $n_d$ is the mole fraction in a partial stream depleted in U–235. The elementary separation effects reached under the above-said operating conditions are 0.016 for the partial streams 9 and 10, 0.006 for the partial streams 18 and 19 and 0.018 for the partial streams 9 and 19. The partial stream 18 has nearly the same uranium isotopic composition as the initial gaseous mixture 8. Furthermore, it should be mentioned that besides the separation of the uranium isotopes a much stronger separation takes place between $H_2$ and $UF_6$. The concentrations of $UF_6$ in the streams 9, 10, 18, and 19 are about 1.5, 17, 15 and 19 mole percent, respectively.

Figure 2:
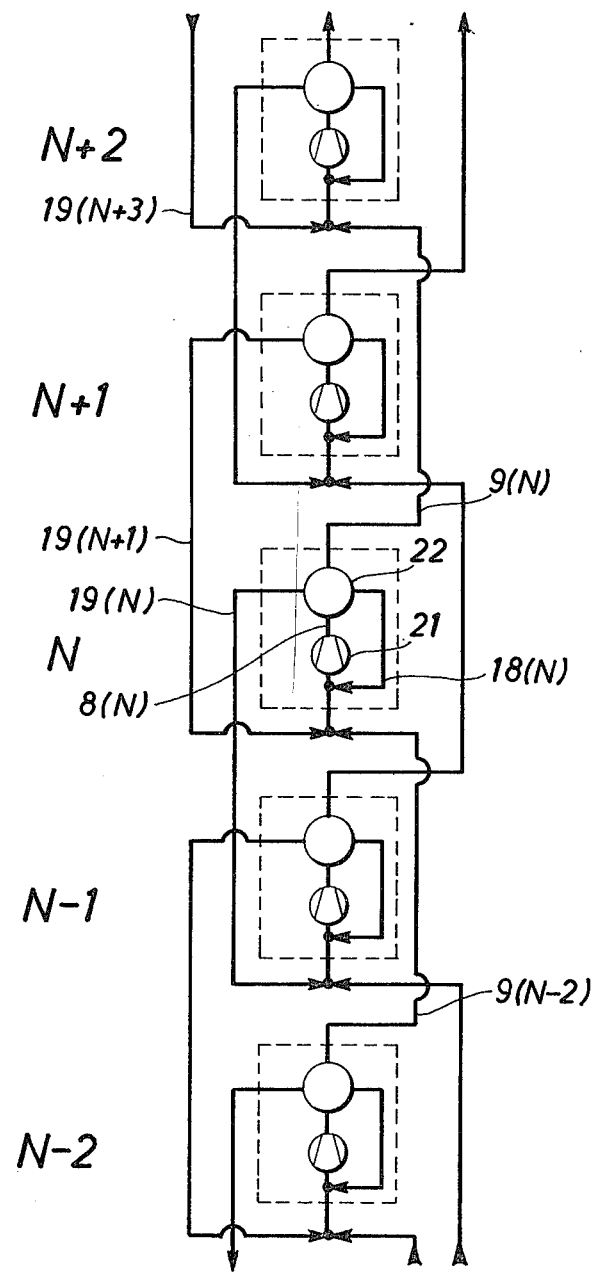
FIG. 2 a schematical section of a cascade with five stages.

FIG. 2 schematically shows a section of a cascade consisting of several stages, where the stage number is denoted by N–2, N–1, N, N+1, N+2. Each stage contains a compressor 21 and a separative unit 22 consisting of several separation systems according to the invention. In the specific case of the cascade shown in FIG. 2 the partial stream 19(N) is fed into the stage N+1. At the entrance of the stage N+2 the stream 9(N) is mixed with the partial stream 19(N+3) which has the same isotopic composition as the stream 9(N). Correspondingly, the partial stream 9(N–2) is mixed with the partial stream 19(N+1) at the entrance of the stage N. The partial stream 18(N) has nearly the same isotopic composition as the streams 9(N–2) and 19(N+1), respectively. Therefore, the stream 18(N) is fed back to the compressor of the stage N, i.e. stream 18(N) circulates inside of the stage N.

It will be understood that the above description of the present invention is susceptible to various modifications, changes and adaptations, and the same are intended to be comprehended within the meaning and range of equivalents of the appended claims.

We claim:

1. In a method for separating a gaseous or vaporous mixture into components having respectively different molecular weights and/or gas kinetic cross sections by causing the mixture to flow through a nozzle-type opening where it forms an expanded stream and by dividing the stream into partial streams by a skimmer diaphragm disposed in the flow path, the partial streams having respectively different compositions, the improvement comprising: deflecting at least one of the partial streams immediately beyond such skimmer, utilizing the kinetic energy contained in that stream; and subjecting such deflected stream to the action of a further skimmer diaphragm to divide that stream into further partial streams having respectively different compositions.

2. A method as defined in claim 1 comprising initially mixing the mixture with a light additional gas.

3. A method as defined in claim 1 further comprising permitting at least one of said partial streams to undergo expansion, and thus accelerate, immediately after the division which formed that partial stream.

4. A method as defined in claim 3 further comprising combining in a cascade those of the outwardly directed partial streams which have essentially the same composition regarding the components of the mixture which is to be separated.

5. A apparatus for separating a gaseous or vaporous mixture into components having respectively different molecular weights and/or gas kinetic cross sections, which apparatus includes a nozzle separator composed of a first nozzle-type opening through which the mixture initially flows and a first skimmer diaphragm disposed at the outlet end of such opening and located for dividing the mixture flowing through such opening into two partial streams, the improvement comprising: means formed as an extension of said first skimmer, and located downstream thereof, defining a deflecting wall for deflecting one of the partial streams formed by said first skimmer, and a second skimmer diaphragm disposed at the downstream end of said wall for dividing the partial stream deflected by said wall into further partial streams.

6. Apparatus as defined in claim 5 wherein said nozzle separator comprises members forming said nozzle-type opening and said first cup-shaped skimmer, and additionally shaped to form an initial deflecting wall, an inlet channel forming the inlet end of said separator, and two extraction channels located at respectively opposite sides of said first skimmer and defining the outlet end of said separator.

* * * * *